Jan. 20, 1948.　　　F. F. HAUPTMAN　　　2,434,694
GROUND SPEED INDICATOR
Filed July 28, 1945　　　6 Sheets-Sheet 1
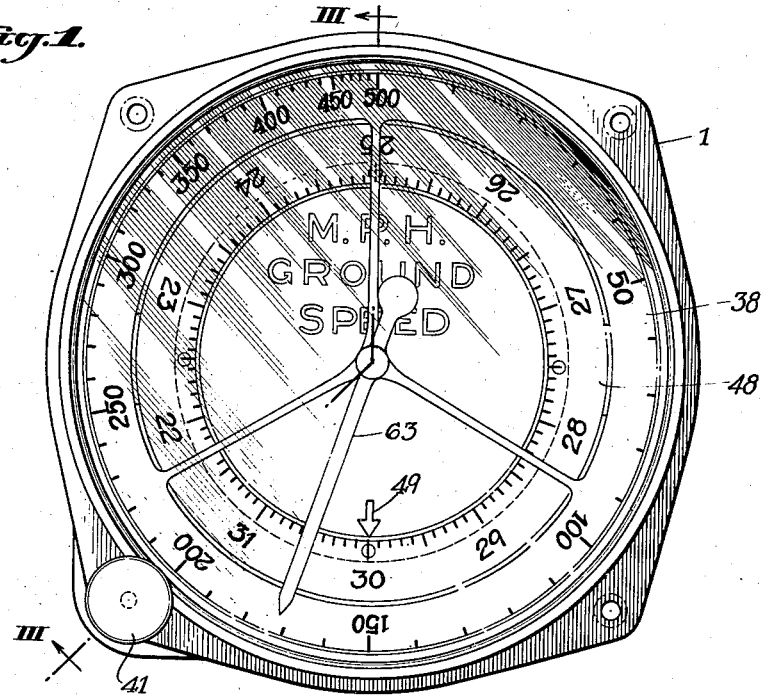
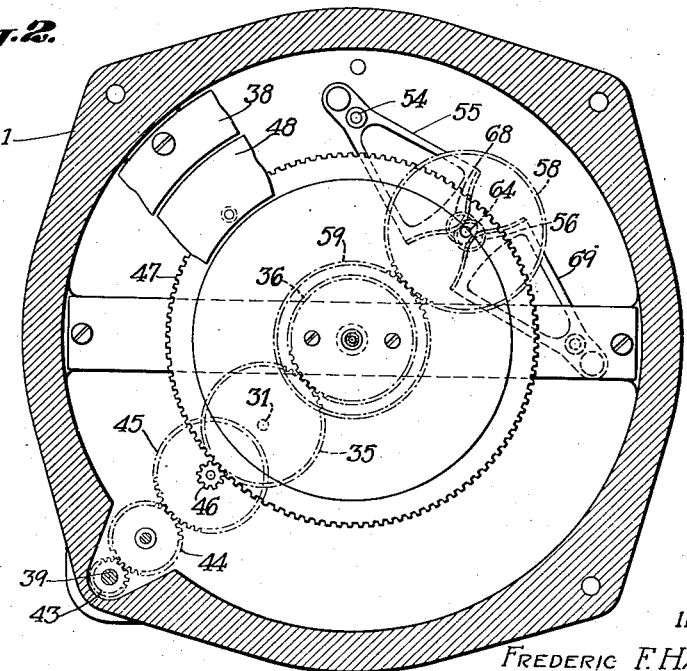
INVENTOR.
FREDERIC F. HAUPTMAN.
BY
ATTORNEY.

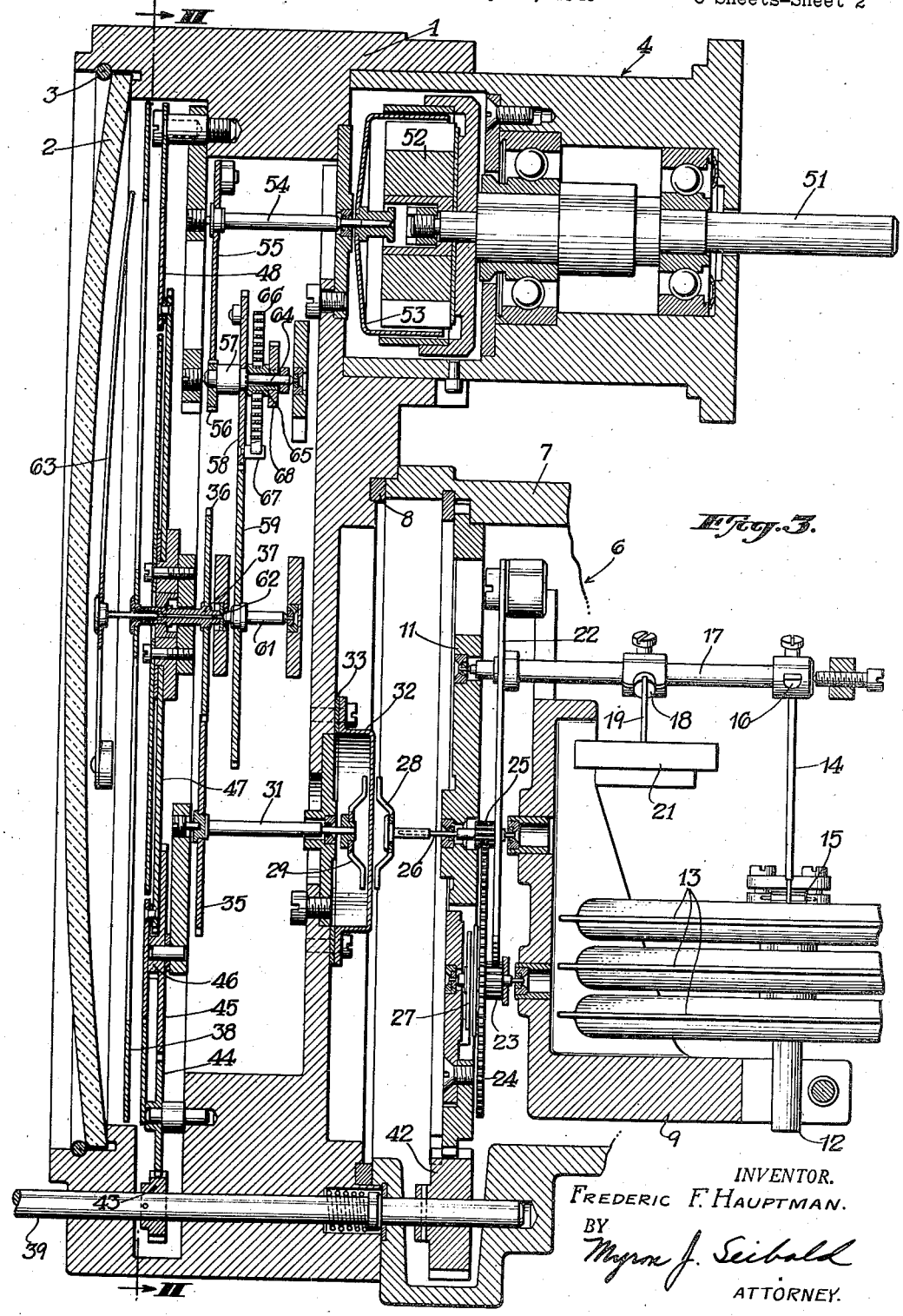

Jan. 20, 1948.                F. F. HAUPTMAN                    2,434,694
                           GROUND SPEED INDICATOR
                            Filed July 28, 1945           6 Sheets-Sheet 3

INVENTOR.
FREDERIC F. HAUPTMAN.
BY
Myron J. Seibald
ATTORNEY.

Jan. 20, 1948.  F. F. HAUPTMAN  2,434,694
GROUND SPEED INDICATOR
Filed July 28, 1945  6 Sheets-Sheet 5

INVENTOR.
FREDERIC F. HAUPTMAN.
BY
ATTORNEY.

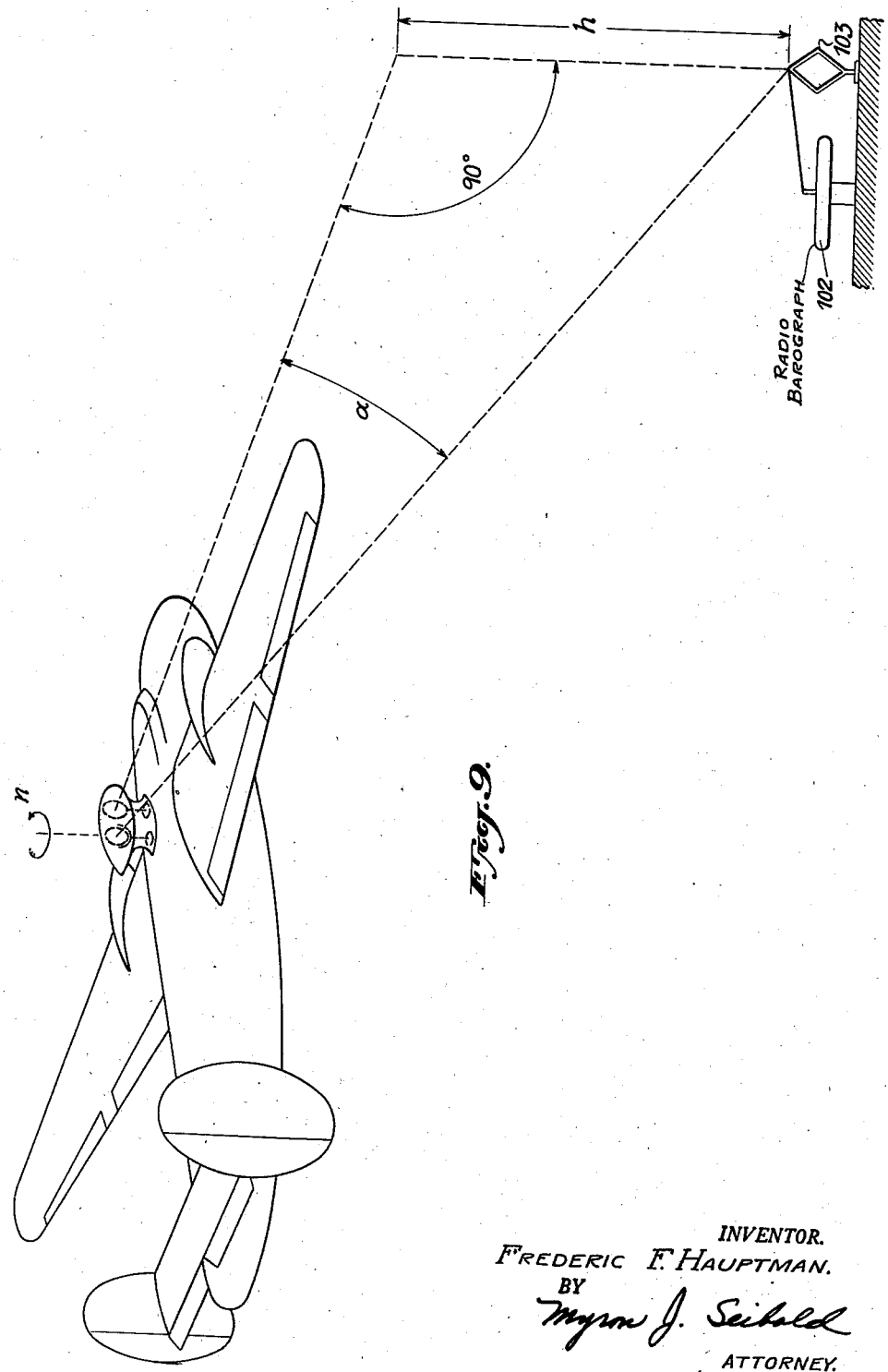

Patented Jan. 20, 1948

2,434,694

UNITED STATES PATENT OFFICE 2,434,694

GROUND SPEED INDICATOR

Frederic F. Hauptman, Rego Park, N. Y., assignor to Square D Company, Detroit, Mich., a corporation of Michigan Application July 28, 1945, Serial No. 607,511

15 Claims. (Cl. 250—11)

1

This invention relates to an instrument for determining the speed of an aircraft relative to a datum point, more particularly aircraft speed relative to the ground.

The object of the invention is an instrument which will provide a direct accurate reading of the aircraft ground speed without requiring visual sighting or computation by the observer.

Another object of the invention is the provision of an aircraft ground speed indicator operating from the radio broadcast of a station, the barometric pressure of which is known.

Another object of the invention is an aircraft instrument which will properly compound the values of altitude above a datum point, angular velocity about the datum point and angle of tilt to the datum point to provide a direct reading of the ground speed of the aircraft.

Another object of the invention is an aircraft ground speed indicator operating from the radio broadcast of a station of known barometric pressure which will properly compound the values of altitude above the station and of the angular velocity and angle of tilt of directional antenna loops directed at the station to provide a direct reading of the ground speed of the aircraft.

Other objects and features of the invention will be readily apparent to those skilled in the art from the specification and appended drawings illustrating certain preferred embodiments in which:

Figure 1 is a front elevational view of a ground speed indicator according to the present invention.

Figure 2 is a transverse sectional view on the line II—II of Figure 3.

Figure 3 is a sectional view on the lines III—III of Figure 1.

Figure 9 is a schematic representation of the relation of the aircraft to the radio broadcast station to which its directional loops are directed.

Figure 4:
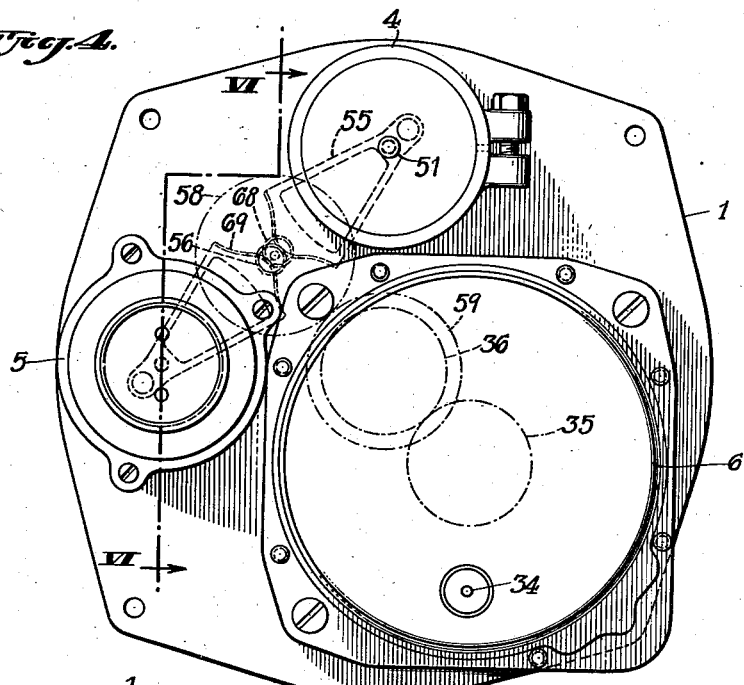
Figure 4 is a rear elevational view of the instrument.
Figure 5:
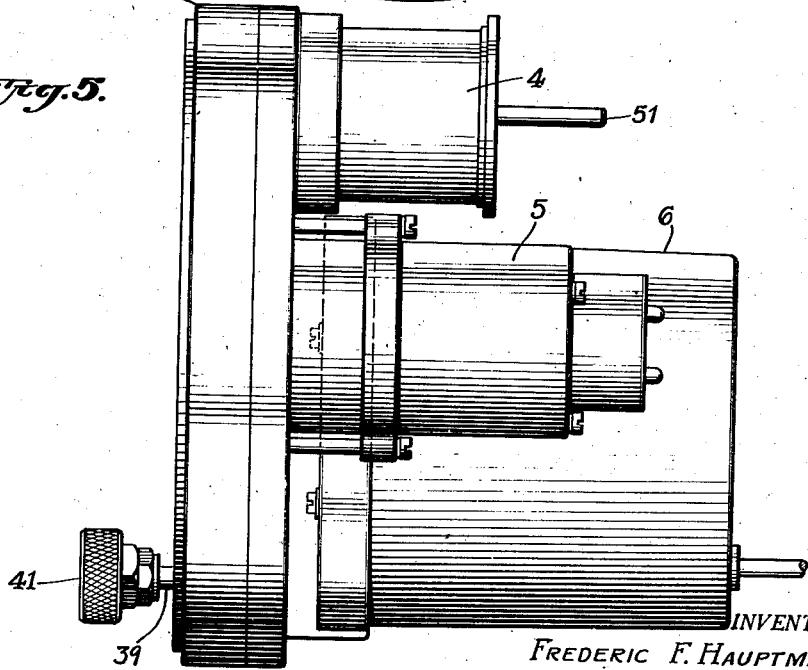
Figure 5 is a side elevational view of the instrument.
Figure 6:
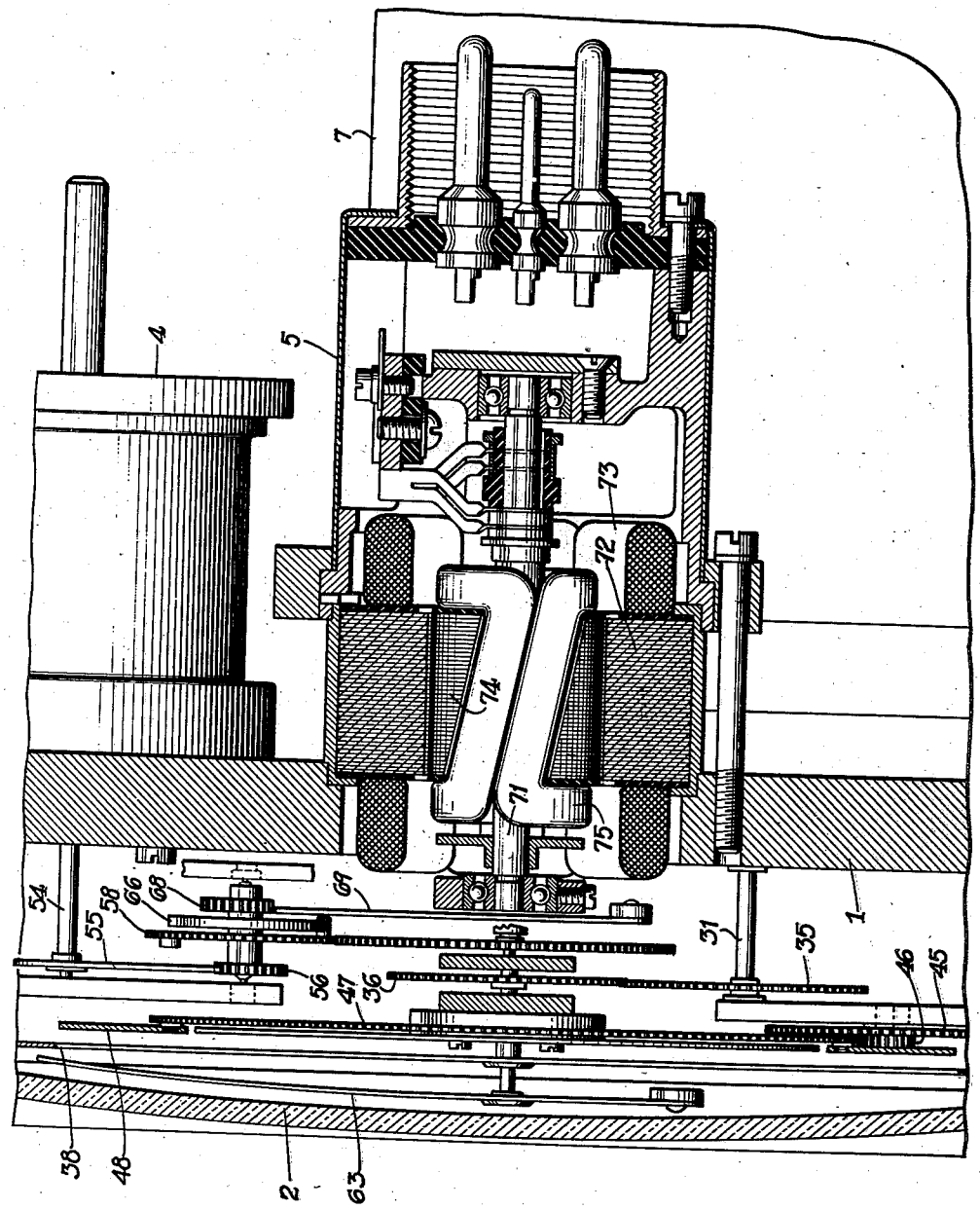
Figure 6 is a sectional view on the lines IV—IV of Figure 4.

The instrument shown in Figures 1 through 6 comprises a casing 1 closed at the front by a transparent glass window 2 maintained in place

2 by a snap ring 3. At the rear of casing 1 are mounted three condition responsive units, a drag cup tachometer unit 4, a self-synchronous receiver unit 5, and an altitude pressure responsive unit 6.

The altitude pressure responsive unit 6 comprises a casing 7 mounted to the casing 1 in airtight relation through the sealing ring 8. Within the casing 7 is a support 9 mounted upon a rotatable ring gear 11. On the support 9, by means of rod 12, are mounted three serially connected aneroid capsules 13 to which are connected a link 14 through a compensating unit 15. The link 14 is pivotally connected to the end of an arm 16 mounted on a rockshaft 17. Also mounted on the rockshaft 17 by arm 18 and link 19 is a counterweight element 21. Upon the rockshaft 17 is mounted a gear sector 22 meshing with a pinion 23 to which is connected a gear wheel 24 meshing with pinion 25 mounted on shaft 26. A light spiral spring 27 biases the gear 24 and pinion 23 to take up any backlash in the gearing parts.

Upon the end of shaft 26 is mounted a rotatable magnetic element 28 which drives a second magnetic element 29 mounted upon shaft 31. Between the magnetic elements 28 and 29 is a nonmagnetic cup 32 mounted to casing 1 in airtight relation through the sealing gasket 33, the magnetic drive element 28, magnetic follower 29 and cup 32 being provided to insure an airtight seal for the casing 7 within which the aneroid capsules 13 are disposed. The casing 7 is adapted to be connected in usual manner to the static opening of a Pitot-static tube through the rear casing opening 34. Upon the shaft 31 is mounted a gear 35 meshing with a gear 36 mounted upon a hollow shaft 37 on the forward end of which is mounted a rotatable annular dial 38 calibrated in units of ground speed as shown in Figure 1.

Within the casings 1 and 7 is rotatably mounted a shaft 39 having a manual knob 41 accessible at the front of the instrument. Upon the shaft 39 is mounted a pinion 42 meshing with the gear wheel 11. Also mounted on the shaft 39 is a pinion 43 meshing with an idler gear 44 which in turn meshes with a gear 45 integral with a pinion 46 which in turn meshes with a large gear disk 47. Upon the gear disk 47 is mounted an annular dial 48 calibrated in units of barometric pressure, inches of mercury as specifically shown in Figure 1. A stationary index 49 is provided with relation to which the values of barometric pressure are read as adjusted by manual rotation of the knob 41.

The drag cup tachometer unit 4 is provided with a rotatable shaft 51 carrying a permanent magnet 52 about which is disposed the cup shaped element 53 of conducting material mounted upon a shaft 54. Rigid with the shaft 54 is a logarithmic gear sector 55 meshing with a pinion 56 eccentrically mounted on a shaft 57. Rigid with the shaft 57 is a gear wheel 58 meshing with the gear 59 mounted on a shaft 61. The shaft 61 has a reduced portion 62 which extends through the hollow shaft 37 and forms a staff supporting a pointer 63.

The shaft 57 has a reduced portion 64 upon which is rotatably mounted a hub 65. A spiral spring 66 has one end connected to the hub 65 and its opposite end mounted upon a pin 67 carried by the gear 58. Rigid on the hub 65 is a pinion 68 mounted eccentrically of the axis of the hub and meshing with a logarithmic gear sector 69. The sector 69 is carried by shaft 71 of the self-synchronous receiver 5. The details of the construction of the self-synchronous receiver form no part of the present invention but it is provided with the usual stationary core 72 and stationary windings 73 and with the rotor magnet 74 and winding 75 mounted on the shaft 71.

Figure 7:
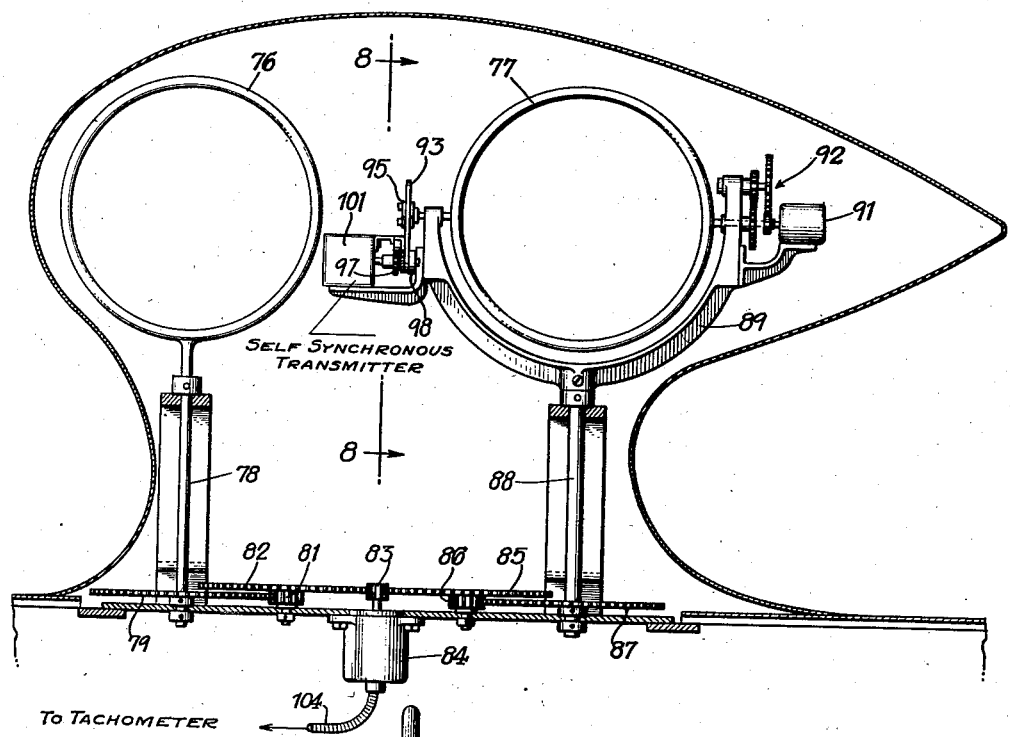
Figure 7 is a partial schematic representation of the directional antenna loops and their operating mechanism.
Figure 8:
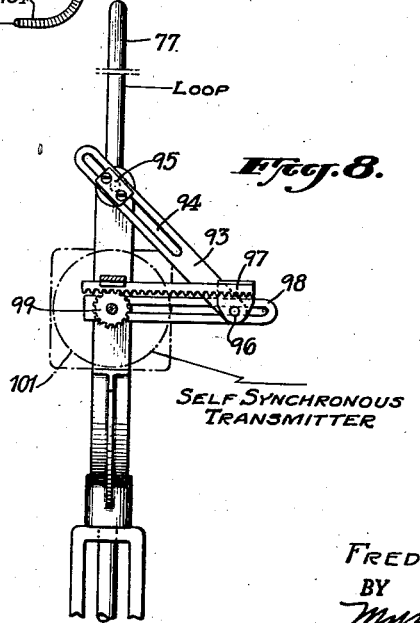
Figure 8 is a detailed view of operating parts for the directional loops.

The directional antenna loops of the aircraft and their operating mechanism shown in Figures 7 and 8 comprise the loops 76 and 77, the loop 76 being rotatable about a vertical axis and the loop 77 about both the vertical and horizontal axes. The loop 76 is supported upon a shaft 78 carrying a gear 79 meshing with a pinion 81. The pinion 81 is connected to a gear 82 meshing with a pinion 83 on the shaft of a motor 84. Also meshing with the pinion 83 is a gear 85 connected to a pinion 86 meshing with a gear 87 on a shaft 88 carrying a cradle 89 in the trunnions of which the loop 77 is pivotally mounted for rotation about its transverse axis. At one side of the cradle 89 is provided a motor 91 which through suitable gearing indicated at 92 effects the tilting of the loop 77. At the opposite side of the cradle 89 there is disposed a lever 93, shown more clearly in Figure 8, having a slot 94 in which is located a rectangular element 95 rigidly disposed on the mounting shaft of the loop 77 and rotatable therewith. The end of the lever 93 is pivotally connected at 96 to a rack 97 which carries a slotted guide 98 and which meshes with a pinion 99 mounted on the shaft of a self-synchronous transmitter 101.

In the schematic representation of Figure 9 there is indicated a radio barograph comprising a pressure responsive element 102 and a broadcast antenna 103. This radio barograph may be automatic in operation, sending forth an identifiable signal indicating the barometric pressure at the station or the broadcast may be an oral recitation of the pressure value. All that is required is that the aircraft operator know the value of the barometric pressure at the station and that the broadcast be in operation so that his automatic radio compass units can be tuned.

The automatic radio compass is a standard item whose detailed construction forms no part of the present invention and it has been considered unnecessary to describe this conventional element herein. However, it will be understood that two such automatic radio compasses are utilized, one of which is responsive to the loop 76 and effects rotation of the motor 84 to maintain the plane of the loop at right angles to the vertical plane through the broadcasting station. A second automatic radio compass unit is connected to the loop 77 and operates the motor 91 to maintain the plane of the loop 77 at right angles to the line to the broadcasting station. The self-synchronous transmitter 101 is connected by wiring, not shown, in conventional manner to the self-synchronous receiver 5. The shaft of motor 84 is connected through a flexible drive cable 104 to the drag cup tachometer unit 4.

In Figure 9 the height of the plane above the broadcasting station has been indicated by the symbol $h$, the tilt angle of the loop 77 is represented by the symbol $a$, and the angular velocity of loops 76 and 77 about a vertical axis is indicated by the symbol $n$. The ground speed of the aircraft is the product of the angular velocity $n$, the altitude $h$, and the co-tangent of the tilt angle $a$. The logarithm of the ground speed will be the sum of logarithm $n$ plus logarithm $h$ plus logarithm co-tangent $a$. The instrument, according to the present invention, adds these logarithmic values so that the ground speed is directly indicated upon the logarithmic scale of dial 38.

As the motor 84 rotates to rotate the loops 76 and 77 about a vertical axis in the travel of the aircraft, the rotor 52 of the drag cup tachometer 4 will be rotated to apply a torque to the cup 53. This effects rotation of shaft 54 and of logarithmic sector 55 to rotate pinion 56 and shaft 57 against the bias of the spring 66. In view of the logarithmic curve form of the gear teeth of the sector 55 meshing with the eccentric pinion 56, the logarithmic value of the angular velocity $n$ will be applied to the shaft 57 and to the gear 58 mounted thereon.

As the loop 77 is tilted to maintain its plane perpendicular to the line to the broadcasting station, the self-synchronous transmitter 101 will be moved, through the lever 93 and the rectangular element 95 sliding in the slot 94 thereof, proportional to the co-tangent of the tilt angle $a$. The rotation of the rotatable element of the self-synchronous transmitter 101 is reflected in a corresponding rotation of the rotor 74 and shaft 71 of the self-synchronous receiver 5. Rotation of the shaft 71 rotates logarithmic sector 69 to rotate pinion 68 and hub 65 to vary the tension on spring 66. Since the gear teeth of the sector 69 are in the form of a logarithmic curve, the rotation of the hub 65 will correspond to the logarithm of the co-tangent of the angle $a$. Since the spring 66 is connected to the gear 58, the amount of rotation of the gear 58 effected by the torque on the drag cup 53 will be determined not only by the speed of rotation of the tachometer shaft 51 but also by the position of the rotor shaft 71 of the self-synchronous receiver 5. Accordingly, in the rotation of the gear 58, the instrument has added the logarithm of the angular velocity $n$ to the logarithm of the co-tangent of the tilt angle $a$. Rotation of the gear wheel 58 rotates gear 59 to rotate shaft 61 and the reduced portion 62 thereof to rotate pointer 63. Hence, the rotation of pointer 63 represents the sum of the logarithms of the angular velocity and the co-tangent of the tilt angle.

By manipulating the knob 41, the operator sets into the instrument the altitude pressure of the broadcasting station. Rotation of the knob through pinion 42 effects rotation of the gear wheel 11 to bodily rotate the altitude responsive elements. The adjusted position is determined by the reading on the dial 48 at the index 49. With the instrument set to the station altitude pressure, the altitude of the plane above the station will be reflected in an expansion of the diaphragm capsules 13 to move link 14 and rotate shaft 17 to rotate the sector 22. Sector 22 rotates pinion 23 and gear 24 connected thereto to rotate pinion 25, shaft 26, and magnetic driver 28. The magnetic element 29 follows the movement of the driver 28 to rotate shaft 31 and gear 35 which in turn rotates gear 36 and hollow shaft 37. The annular scale 38 is mounted on the shaft 37 and rotates therewith. As the altitude-altitude pressure relation is logarithmic, the angular movement of the annular dial 38 by the calibrated altitude pressure responsive mechanism will be logarithmic with respect to the altitude difference. The angular movement of the dial 38 adds to the angular movement of the pointer 63 so as to add the logarithm of the altitude difference to the logarithms of the angular velocity and tilt angle to effect the desired reading of the ground speed on the logarithmic scale of the dial 38 opposite the pointer 63.

In the operation of the instrument, the operator, to secure a direct reading, sets the broadcasting station altitude pressure by rotating the dial 48 relative to the index 49 through the manual knob 41, tunes his automatic radio compasses to the broadcasting station and secures a direct reading at the position of the pointer 63 relative to the dial 38 of his ground speed without the necessity for any other manipulations.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A ground speed indicator for aircraft comprising means responsive to the altitude of the aircraft above a datum point, means responsive to the angular velocity of the aircraft about the datum point, means responsive to the tilt angle of a line from the aircraft to the datum point, a dial calibrated in units of ground speed, a reference with respect to which said dial is read, and means for effecting relative movement between said dial and reference in accordance with the response of said three responsive means to indicate by the position of the reference relative to the indicia on the dial the ground speed of the aircraft.

2. In a ground speed indicator for aircraft, means movable proportionately to the difference in altitude pressure between said aircraft and a datum point, means movable proportionately to the logarithm of the angular velocity of the aircraft about the datum point, means movable proportionately to the logarithm of the co-tangent of the tilt angle of a line from the aircraft to the datum point, a dial having a logarithmic scale of indicia of ground speed, a reference with respect to which said dial is read, and means for correlating the movement of said movable means to effect relative movement between said dial and reference to indicate by the position of the reference relative to the dial indicia the ground speed of the aircraft.

3. In a ground speed indicator for aircraft, means movable proportionately to the difference in altitude pressure between the aircraft and a datum point, means movable proportionately to the logarithm of the angular velocity of the aircraft about the datum point, means movable proportionately to the logarithm of the co-tangent of the tilt angle of a line from the aircraft to the datum point, a dial having a logarithmic scale of indicia of ground speed, a reference with respect to which said dial is read, and means for effecting relative movement between said dial and reference through a distance equal to the sum of the movements of said movable means to indicate by the position of the reference relative to the indicia on the dial the ground speed of the aircraft.

4. In a ground speed indicator for aircraft, means movable proportionately to the logarithm of the difference in altitude between the aircraft and a datum point, means movable proportionately to the logarithm of the angular velocity of the aircraft about the datum point, means movable proportionately to the logarithm of the co-tangent of the tilt angle of a line from the aircraft to the datum point, a dial having a logarithmic scale of indicia of ground speed, a reference with respect to which said dial is read, and means for effecting relative movement between said dial and reference for a distance equal to the sum of the movements of said movable means to indicate by the position of the reference relative to the indicia on the dial the ground speed of the aircraft.

5. In a ground speed indicator for aircraft, a rotatable dial carrying indicia of units of ground speed, a rotatable pointer movable across said dial and with respect to which the ground speed indicia is read, means responsive to the altitude of the aircraft above a datum point, means responsive to the angular velocity about the datum point, means responsive to the tilt angle of a line from the aircraft to the datum point, and means for rotating said dial and pointer so that the sum of their movements is the sum of the movements of said responsive means to indicate by the position relative to the dial the ground speed of the aircraft.

6. In a ground speed indicator for aircraft, a rotatable dial carrying indicia of units of ground speed, a rotatable pointer movable across said dial and with respect to which the ground speed indicia is read, means for rotating said dial through an angle proportional to the difference in altitude pressure between the aircraft and a datum point, and means for rotating said pointer through an angle equal to the sum of the logarithm of the angular velocity of the aircraft about the datum point and the logarithm of the co-tangent of the tilt angle of a line from the aircraft to the datum point whereby the position of the pointer relative to the indicia on the dial will indicate the ground speed of the aircraft.

7. In a ground speed indicator for aircraft, a rotatable dial carrying indicia of units of ground speed, a rotatable pointer movable across said dial and with respect to which the ground speed indicia is read, means for rotating said dial through an angle proportional to the difference in altitude pressure between the aircraft and a ground broadcast station, directional means tuned for direction toward the broadcast station in the travel of the aircraft, and means for rotating said pointer through an angle proportional to the sum of the logarithm of the angular velocity of the directional means about a vertical axis and the logarithm of the co-tangent of the tilt angle of the directional means whereby to indicate by the position of the pointer relative to the indicia on the dial the ground speed of the aircraft.

8. In an instrument for determining the ground speed of an aircraft from the broadcast beam of a ground radio station of known altitude pressure, directional means tuned for direction toward the station in the travel of the aircraft, means responsive to the altitude pressure of the aircraft, means for adjusting said responsive means to the known altitude pressure of the broadcast station, a dial calibrated in units of ground speed, a reference with respect to which said dial is read, and means correlating the movements of said responsive means and of said directional means to effect relative movement between said dial and reference to indicate by the position of the reference relative to the indicia on the dial the ground speed of the aircraft.

9. An instrument for determining the ground speed of an aircraft from the broadcast beam of a radio station comprising means responsive to the difference in altitude between said aircraft and broadcast station, means responsive to the angular velocity of the aircraft about the broadcast station, means responsive to the tilt angle of a line from the aircraft to the broadcast station, a dial calibrated in units of ground speed, a reference with respect to which said dial is read, and means for effecting relative movement between said dial and reference in accordance with the response of said responsive means to indicate the ground speed of the aircraft.

10. In an instrument for determining the ground speed of an aircraft from the broadcast beam of a radio station, directional means tuned for direction toward the station in the travel of the aircraft, means responsive to the difference in altitude between said aircraft and broadcast station, means responsive to the angular velocity of the directional means about a vertical axis in the travel of the aircraft, means responsive to the tilt angle of the directional means, a dial calibrated in units of ground speed, a reference with respect to which said dial is read, and means for effecting relative movement between said dial and reference in accordance with the response of said responsive means to indicate the ground speed of the aircraft.

11. In an instrument for determining the ground speed of an aircraft from the broadcast beam of a ground radio station, means for setting in the instrument the altitude pressure at the broadcast station, directional means tuned for direction toward the station in the travel of the aircraft, a dial calibrated in units of ground speed, a reference with respect to which said dial is read, and means for effecting relative movement between said dial and reference proportionately to the sum of the logarithms of the altitude difference between the aircraft and broadcast station, the angular velocity of the directional means about a vertical axis, and the co-tangent of the tilt angle of the directional means.

12. In an instrument for determining the ground speed of an aircraft from the broadcast beam of a ground radio station, means for setting in the instrument the altitude pressure at the broadcast station, directional means comprising radio antenna loops tuned for direction toward the station in the travel of the aircraft, means responsive to the difference in altitude between said aircraft and broadcast station, means responsive to the angular velocity of the directional loop in the travel of the aircraft, means responsive to the tilt angle of the directional loop, a dial calibrated in units of ground speed, a reference with respect to which said dial is read, and means for effecting relative movement between said dial and reference in accordance with the response of said responsive means to indicate the ground speed of the aircraft.

13. In an instrument for determining the ground speed of an aircraft from the broadcast beam of a ground radio station, means for setting in the instrument the altitude pressure at the broadcast station, directional means comprising radio antenna loops tuned for direction toward the station in the travel of the aircraft, means movable proportionately to the difference in altitude pressure between said aircraft and broadcast station, means movable proportionately to the logarithm of the angular velocity of the directional loop about a vertical axis in the travel of the aircraft, means movable proportionately to the logarithm of the co-tangent of the tilt angle of the directional loop, a dial having a logarithmic scale of indicia of ground speed, a reference with respect to which said dial is read, and means for effecting relative movement between said dial and reference through a distance equal to the sum of the movements of said movable means to indicate by the position of the reference relative to the indicia on the dial the ground speed of the aircraft.

14. In an instrument for determining the ground speed of an aircraft from the broadcast beam of a ground radio station, means responsive to the altitude pressure of the aircraft, means for adjusting said responsive means to the altitude pressure of the broadcast station so that the movement thereof is a function of the difference in altitude pressure between the aircraft and the broadcast station, directional means tuned for direction toward the station in the travel of the aircraft, means exerting a torque whose value is determined by the angular velocity of the directional means about a vertical axis in the travel of the aircraft, responsive means movable by said torque against a spring bias, positional means determining the value of said spring bias in response to variation in the tilt angle of said directional means, a dial calibrated in units of ground speed, a reference with respect to which said dial is read, and means for effecting relative movement between said dial and reference in accordance with the movement of said responsive means to indicate the ground speed of the aircraft.

15. In an instrument for determining the ground speed of an aircraft from the broadcast beam of a ground radio station, means responsive to the altitude pressure of the aircraft, means for adjusting said responsive means to the altitude pressure of the broadcast station so that movement thereof is a function of the difference of altitude pressure between the aircraft and the broadcast station, directional means tuned for direction toward the station in the travel of the aircraft, means exerting a torque whose value is proportional to the logarithm of the angular velocity of the directional means about a vertical axis, responsive means movable by said torque against a spring bias, positional means determining the value of said spring bias in accordance with the logarithm of the co-tangent of the tilt angle of said directional means, a dial calibrated in units of ground speed, a reference with respect to which said dial is read, and means for effecting relative movement between said dial and reference in accordance with the movement of said responsive means to indicate the ground speed of the aircraft.

FREDERIC F. HAUPTMAN.